Sept. 11, 1934.   H. M. FRIENDLY   1,973,563
HIGHWAY TRAFFIC SIGNAL SYSTEM
Filed Nov. 11, 1926    5 Sheets-Sheet 1
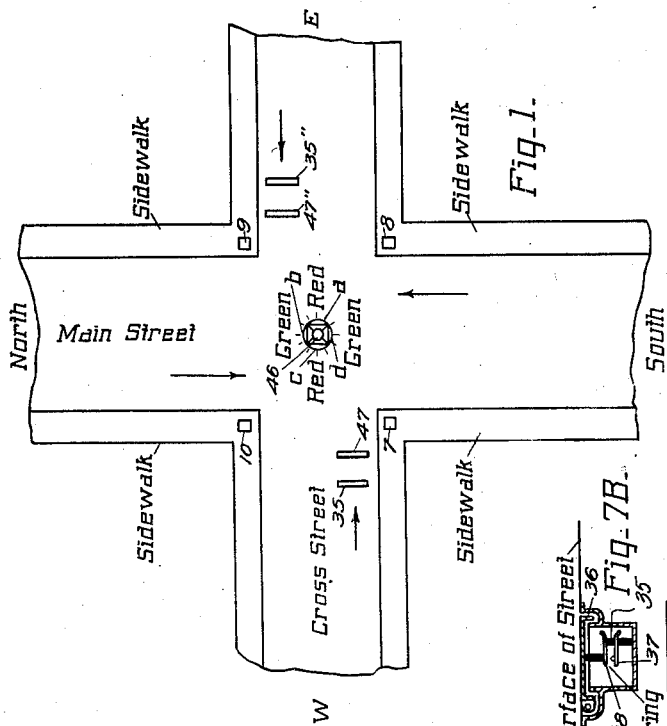
Inventor –
Herbert M. Friendly
Atty Sept. 11, 1934. H. M. FRIENDLY 1,973,563
HIGHWAY TRAFFIC SIGNAL SYSTEM
Filed Nov. 11, 1926 5 Sheets-Sheet 2
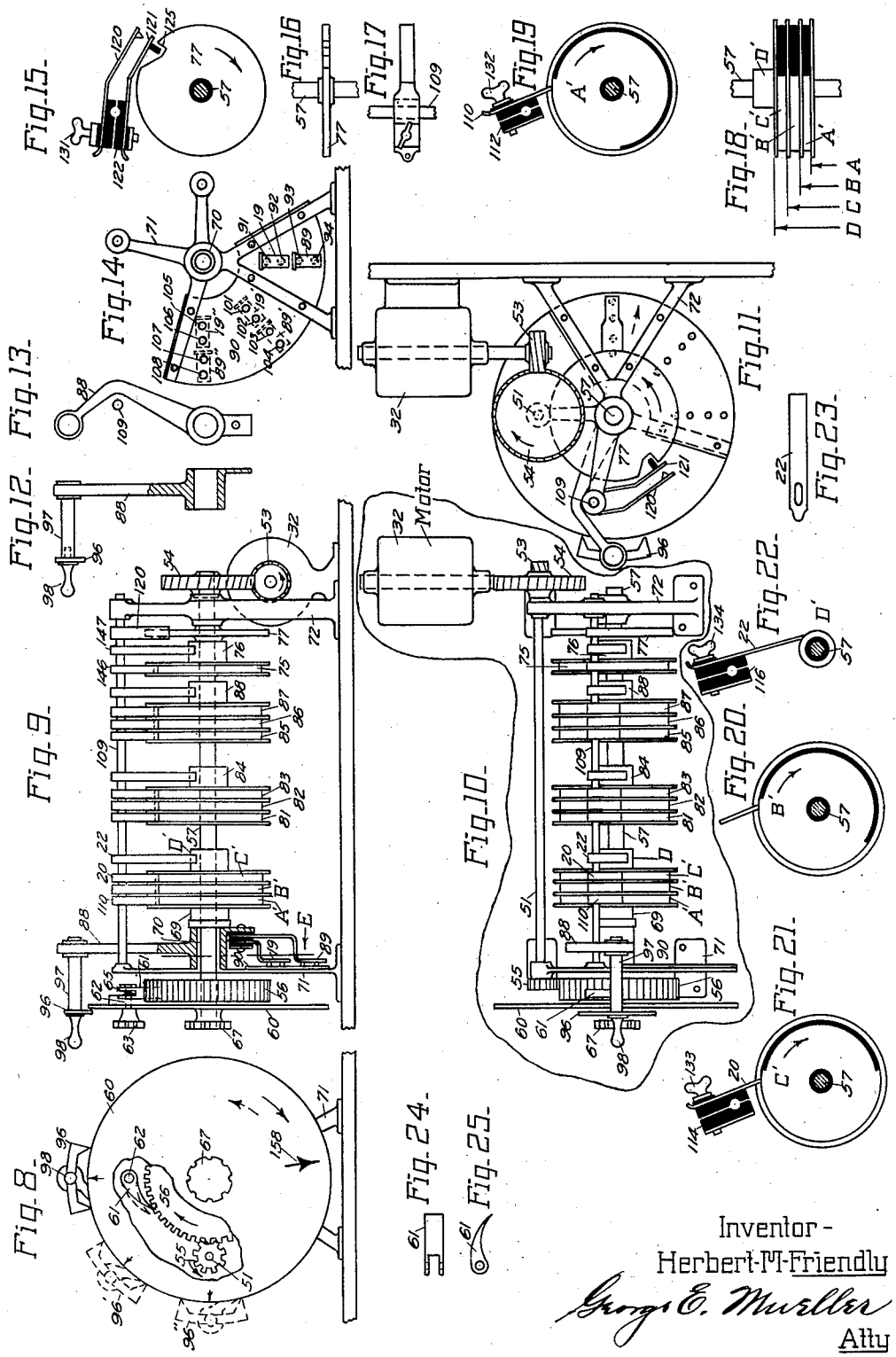
Inventor -
Herbert M. Friendly
George E. Mueller
Atty

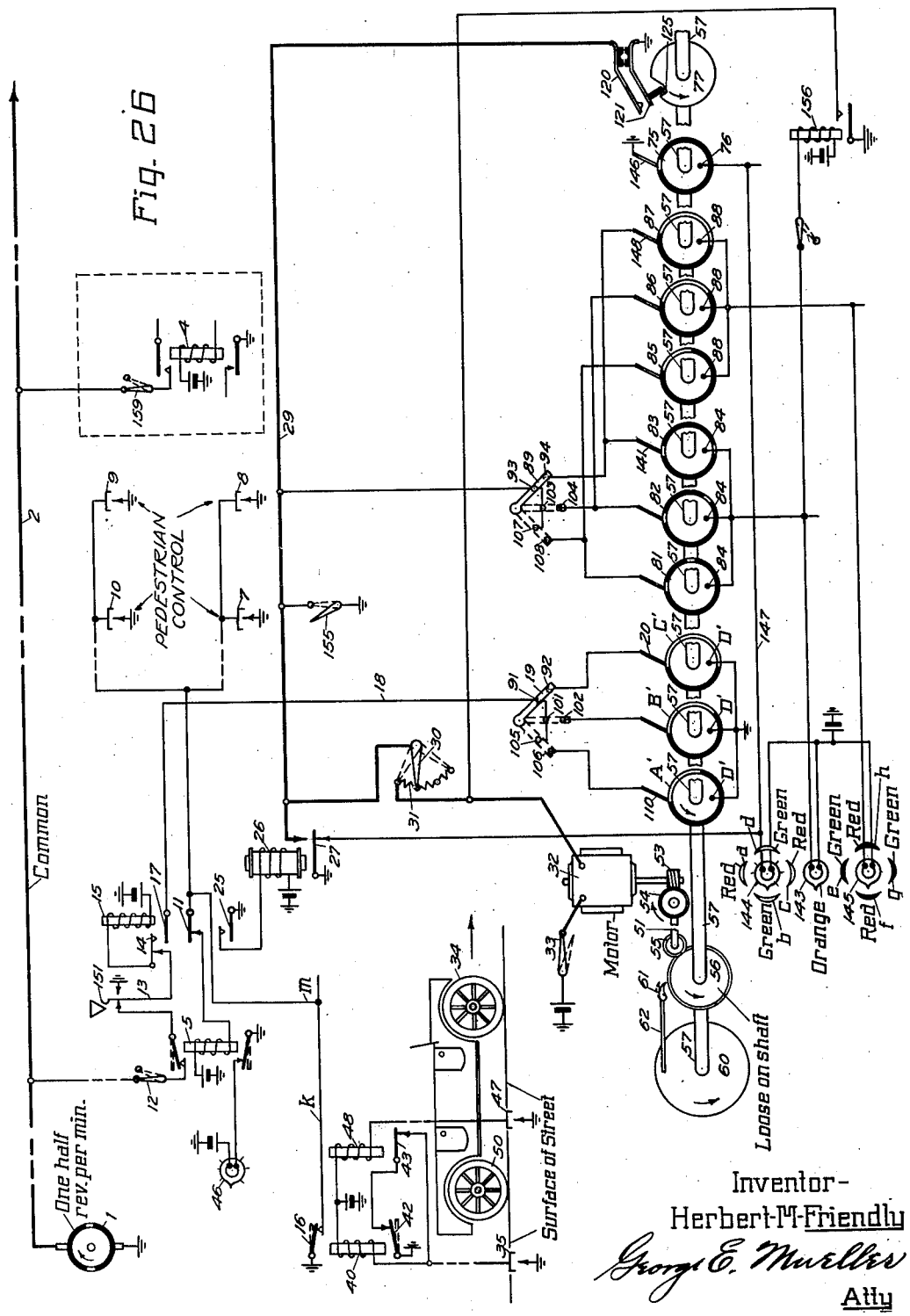

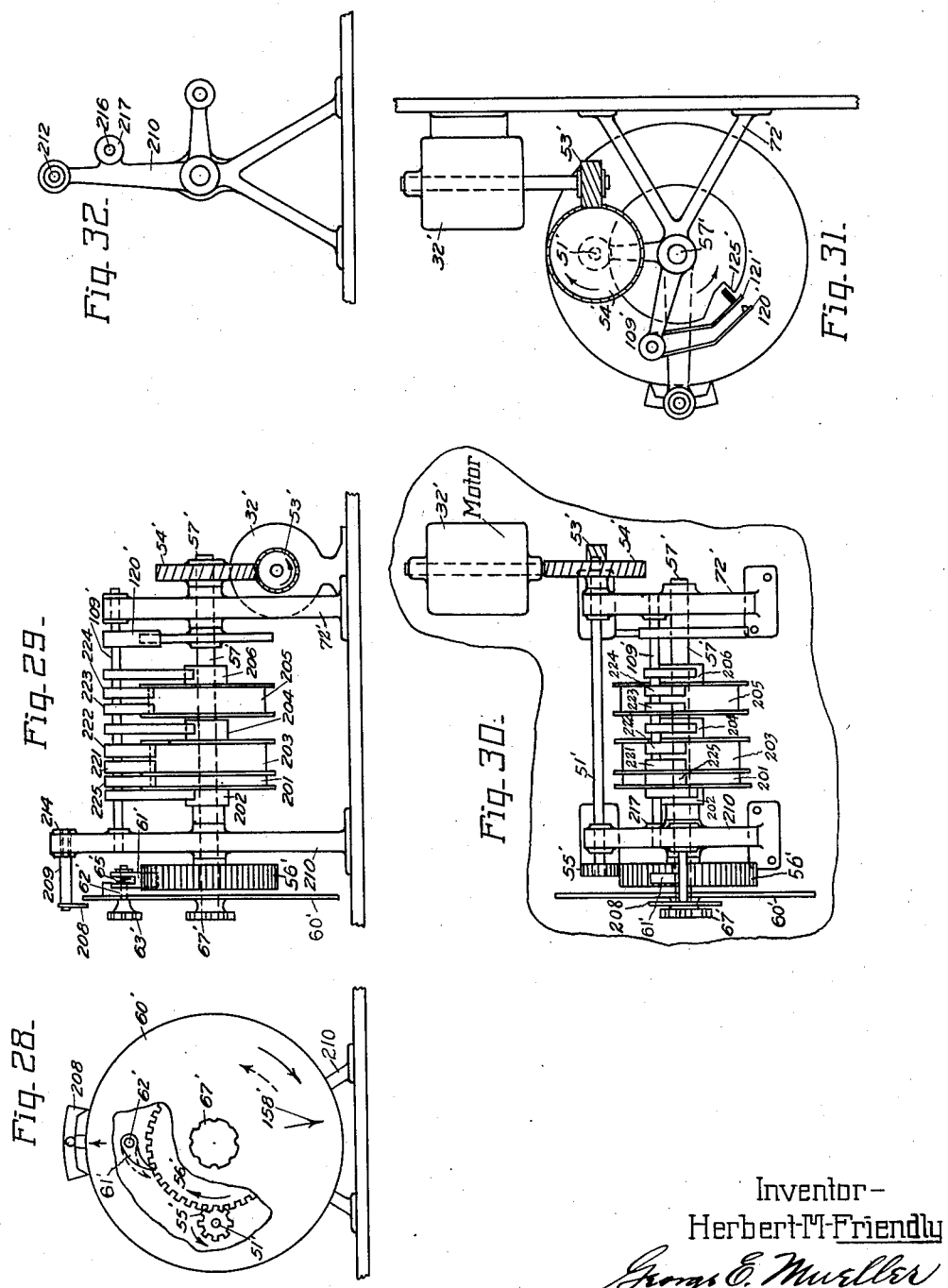

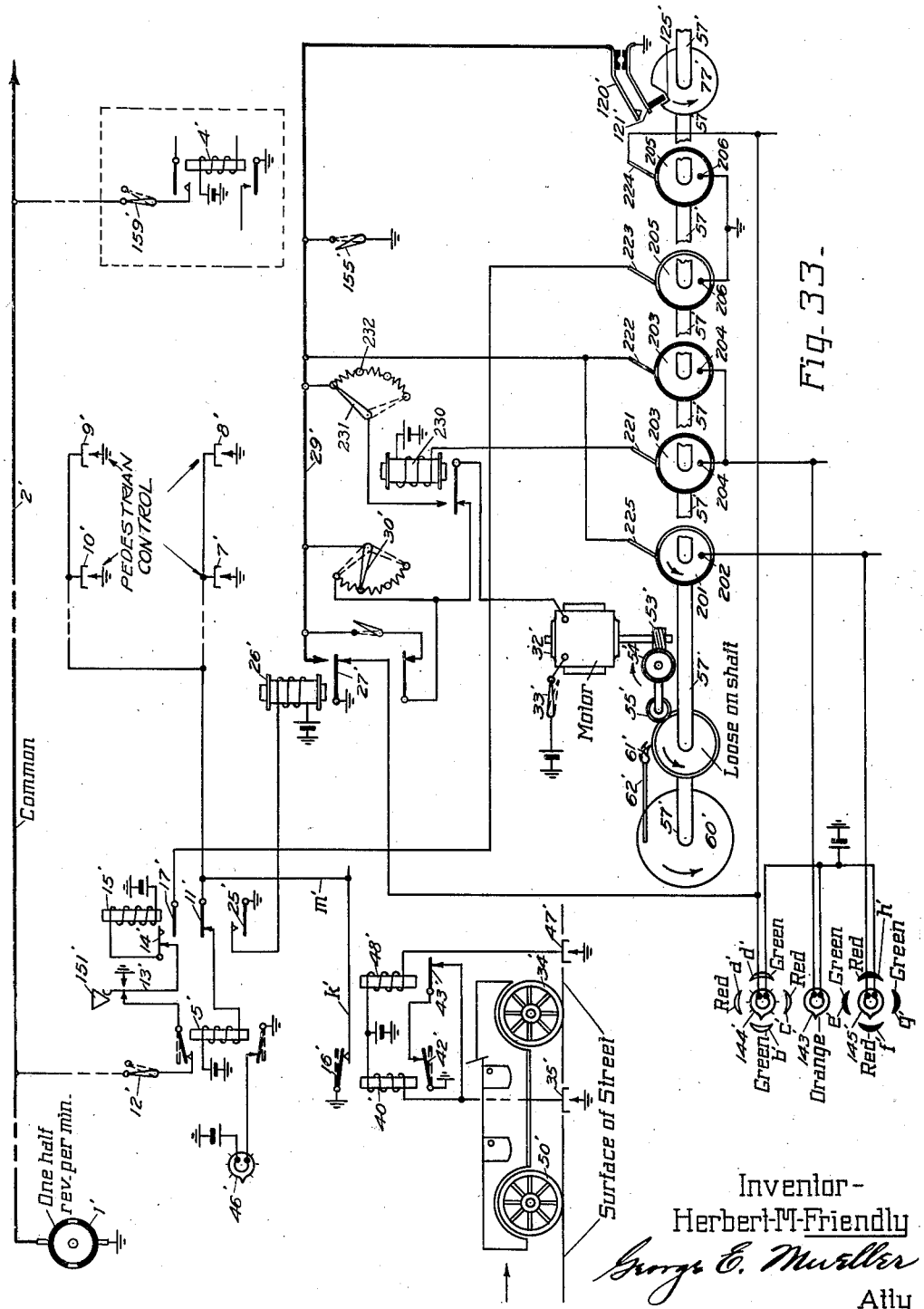

Patented Sept. 11, 1934

1,973,563

UNITED STATES PATENT OFFICE 1,973,563

HIGHWAY TRAFFIC SIGNAL SYSTEM

Herbert M. Friendly, Chicago, Ill.; Milton S. Friendly and Central Republic Trust Company, executors of said Herbert M. Friendly, deceased, assignors to Milton S. Friendly, Chicago, Ill.; Oscar N. Friendly, Salt Lake City, Utah; and Central Republic Trust Company, Chicago, Ill., a corporation of Illinois, trustees under the will of Herbert M. Friendly, deceased Application November 11, 1926, Serial No. 147,816

17 Claims. (Cl. 177—337)

The present invention refers to systems of the general class to which my pending application for U. S. Patent, Serial No. 595,831, filed October 20, 1922, belongs. However, the present invention contemplates other objects and functions, which are novel, so far as I am aware.

The organization of the present system chosen to elucidate the invention contemplates a periodic grounding device which applies ground impulses to a common conductor extending along a street or streets, and from which common conductor connections are made to so-called traffic signal stations, located at street intersections or other street crossing points, respectively. The said signal stations are respectively arranged to normally display a clear (green) signal along a so-called main street, and a stop or bar (red) signal along a street crossing the said main street at the location. That is, the main street will normally have a clear way, or at least have superior traffic rights, while cross streets to it will be normally barred, or have secondary traffic rights with respect to the main street.

Each said traffic signal station consists of a suitable lantern, observable to the traffic, and having three sets of specifically colored discs and corresponding lamp for each set, or a corresponding plurality of multipled lamps for the discs, so a lamp will be specific for each said disc. Supplementing the three sets of colored discs is a guard lamp, preferably of a distinctive color, the object of which is to indicate if the specific station is set for the next potential change period, which said potential change period, it will appear, is manifested by the momentary grounding of the said common conductor.

The lamps for each lantern are controlled by a motor-driven mechanism specific to the lantern. The said mechanism is normally at rest, but its operation is subject to initiation at predetermined periodic intervals in correspondence with the ground impulses sent from the said grounding device to the common conductor referred to. Regardless of the operation of the grounding device, the operation of the mechanism for controlling the specific lantern lamps under one method of operation will not be initiated unless a supplemental setting is willfully made effective to a specific said mechanism and lantern. That is, a circuit must be directively closed with reference to a specific said mechanism and its lantern before it will become capacitated to operate the lamps of the lantern. More specifically, it is necessary to have a circuit path leading from the said common conductor to the concerned specific lantern station closed by directed means at the time the ground impulse is applied to the said common conductor. The ground applied to the said common conductor will then be effective to initiate the automatic operation of the said mechanism to operate its specific lantern lamps, but only for a single cycle of operations. However, it will be variably and automatically controlled by predetermined setting or manually controlled at any stage; possibly by a traffic officer or attendant. The said control of the lamps of the lantern will be independent as regards other lanterns of the system, though it will be manifest that the periodic grounding of the said common conductor may be varied, and which will correspondingly affect the operation of the specific lanterns, subject to the said manual control. It will also be manifest that in lieu of a manual setting, preparatory for only a single cycle of operations of the lamps of a specific lantern, a switch may be set to cause the lamps of the lantern to operate automatically in periodic cycles, responsive to the periodic groundings of the said common conductor.

The lantern (or multipled lanterns) for any specific street signal point or crossing may be controlled by either of two directive methods. One method contemplates that the pedestrian maintain a circuit path to the said common conductor closed at the time it is grounded, and the other method contemplates that a vehicle wheel shall operate a circuit closer which will cause a relay to actuate and lock to effect the closure of the said circuit path to the said common conductor. However, a second companion circuit closer is provided, which if operated by the vehicle wheel after the wheel causes the first said closure, which will be effective to negate the effect of the first said closure effected by the wheel. In carrying out this phase of the invention, in the exampled organization, a circuit closer is placed near the edge of the sidewalk at each of the four corners of the street intersection. These circuit closers are of any suitable type which remain normally open-circuit and which provide a suitable standing space upon which a pedestrian may stand to operate the circuit closer under the influence of his weight. That is, the pedestrian desiring to cross the main street, which normally has the right of way, will step upon any one of the four circuit closers (depending from where he wishes to cross the main street) and await until the said common conductor becomes grounded from the said grounding device, at which time the said motor-driven mechanism specific to the crossing concerned will initiate its operation and then automatically complete its cycle of operations, as will appear, the pedestrian proceeding to cross the street, since the maintenance of the cycle of operations of the said motor driven mechanism is not dependent upon the pedestrian after its operation has been initiated. Moreover, only one cycle of operations will ensue from the initiation, unless the mechanism is pre-set to operate continuously, or is otherwise forthwith re-initiated by a traffic officer in the manner as will be discussed presently. Of course, it will be manifest that in lieu of providing circuit closers adapted to be held closed by the weight of the pedestrian, push buttons or switches otherwise manually operated by the pedestrian or the traffic officer may be substituted without departing from the spirit of and function of the invention. In this connection, it will be noted that the cited pending application for patent admits of the pedestrian momentarily operating a circuit closer and thereby setting the system to operate the specific lantern at the concerned intersection at the next potential operating period, being the time the common conductor is next grounded. This latter stated method set forth in the citation has the disadvantage of causing the signals to be operated at the next potential operating period, regardless of the fact that the pedestrian may change his mind as to crossing after depressing the push button, or if he decides to cross the street without waiting for the signals to operate to halt the traffic or give him the right of way.

Further, as to the means of the present invention, two vehicle wheel operated circuit closers are placed in the line of traffic (being two circuit closers for each direction) of the cross street at a suitable distance back from the line of the main street, which has been stated has the normal right of way. These vehicle wheel operated circuit closers may be located approximately six feet (or other distance) apart, so that if the front wheel of the vehicle passes over one of them, and due to the weight or otherwise thereby closes a circuit to set the mechanism at the specific intersection to initiate its operation at the next potential halting period, the front wheel next passing over the other of the said wheel-operated circuit closers will negate the set-up condition effected by the front wheel operating the first said wheel-operated circuit closer. If the driver of the vehicle halts it before the front wheel operates the second said wheel operated circuit closer, the signal device mechanism at the corresponding intersection station will be set to operate at the next potential halting period as set forth when controlled by the pedestrian. However, if the driver causes the front and rear vehicle wheels to pass over both circuit closers successively, before the potential halting period occurs, there will be no initiation of the operation of the signal device resultant, as both settings (one by the front and the other by the rear wheel) have been negated.

It will be clear that if the said wheel-operated circuit closers are spaced shorter than the wheel base distance of the vehicle, it will be possible to allow the front wheel to pass over and operate the second closer after operating the first closer to negate the setting effected by the first closer and then permit the rear wheel to pass over the first closer to again set the signal device; the setting effective to the first closer being again negated if the rear wheel is caused to pass over the second closer before the potential halting period occurs. The object of this provision is to permit the driver to cross the main street at any time after the setting and before the potential halting period without causing an operation of the corresponding signal device, due to the fact that the first circuit closer operated sets the signal device preparatory for operation from the next grounding of said common conductor, and the second circuit closer operated negates the setting, regardless of how many times the circuit closers are operated during the time the main street traffic has the right of way. This also holds in case the cross traffic has the right of way at the time. In this connection, it will be noted that the cited pending application for patent admits of the driver halting upon the circuit closer for a predetermined time, after which time the corresponding signal mechanism is set to halt the traffic on the main street at the next potential halting period, regardless of whether the driver proceeds to cross the main street before the potential halting period.

A feature of the invention is the advance (orange) lamp which starts to glow in advance of a change of the red and green lamps referred to. The use of advance lamps is not new. However, the present invention provides means for variably setting the mechanism so the orange lamp will have any desired glowing duration independent of the duration of the glowings of the said red and green lamps.

Other features of the invention and the invention itself will be described hereinafter.

With reference to the accompanying drawings:—

Fig. 1 shows a street intersection and location of the sidewalk (pedestrian) and the street surface (vehicle wheel) circuit closers and the corresponding signal lantern at the center of the intersection.

Figs. 2, 3, 4 and 5 show the respective four sides of the rectangular signal lantern shown in Fig. 1, and a portion of the support post, broken off.

Fig. 6 shows a top plan view of a sidewalk circuit closer.

Fig. 6B shows a section of the circuit closer shown in Fig. 6 along the line 6B.

Fig. 7 shows a top plan view of a street surface circuit closer.

Fig. 7B shows a section of the circuit closed shown in Fig. 7 along the line 7B.

Fig. 7C shows a preferred form of operating the circuit closing contacts in Fig. 7B.

Fig. 8 shows a front elevation of one form of intersection signal operating mechanism with a portion broken away.

Fig. 9 shows a side elevation of the mechanism shown in Fig. 8.

Fig. 10 shows a plan view of the mechanism shown in Figs. 8 and 9.

Fig. 11 shows a rear elevation of the mechanism shown in Figs. 8—9—10.

Fig. 12 shows a detail of the manual switch arm of Fig. 9.

Fig. 13 shows a side view of the manual switch arm shown in Fig. 12.

Fig. 14 shows a detail of the front standard or support member of Fig. 9.

Fig. 15 shows a detail of the circuit closing cam and switch shown in Fig. 9.

Fig. 16 shows a plan view of the cam shown in Fig. 15.

Fig. 17 shows a plan view of the circuit closer shown in Fig. 15.

Fig. 18 shows a set of commutators shown at the left-hand set in Fig. 9.

Fig. 19 shows an elevation along the section A of Fig. 18.

Fig. 20 shows an elevation along section line B of Fig. 18.

Fig. 21 shows an elevation along section line C of Fig. 18.

Fig. 22 shows an elevation along line D of Fig. 18.

Fig. 23 shows a plan view of the brush shown in Fig. 22.

Fig. 24 shows a top elevation of pawl shown in Fig. 8.

Fig. 25 shows a side elevation of pawl shown in Fig. 24.

Fig. 26 shows the schematic circuit arrangement with relation to the elements of the system.

Fig. 27 shows a detail of Fig. 26 as introduced into Fig. 26 where indicated by the reference designations.

Fig. 28 shows a front elevation of a preferred form of signal operating mechanism. It corresponds to Fig. 8.

Fig. 29 shows a side elevation of the mechanism shown in Fig. 28. It corresponds to Fig. 9.

Fig. 30 shows a plan view of the mechanism shown in Figs. 28 and 29. It corresponds to Fig. 10.

Fig. 31 shows a rear elevation of the mechanism shown in Figs. 28, 29 and 30. It corresponds to Fig. 11.

Fig. 32 shows a detail of the front standard or support member of Fig. 29. It corresponds to Fig. 14.

Fig. 33 shows a preferred schematic circuit arrangement with relation to the elements shown in Figs. 28 to 32, inclusive.

Referring to Fig. 26, the grounding device 1 may be any suitable device for periodically grounding the common conductor 2; being at the rate of one time each sixty seconds, in the exampled system, though this rate may be altered from time to time by changing the speed of the motor (not shown) driving the said device 1. The grounding device 1 may be located at any suitable point, from which the common conductor 2 leads, wherein taps extend therefrom to each street intersection or other crossing point at which a signal lantern and companion operating mechanism is located. That is, the common conductor may extend along a street to operate signal lanterns at crossing points thereto, or it may run to random crossing points of different streets, or both. In the present disclosure the schematic electrical circuits of one signal station is shown in Fig. 26. Another one is indicated by the relay 4 in Fig. 26, which has a corresponding function to relay 5 thereof, this signal station represented by relay 4 being shown within the dotted lines.

Before proceeding further with the circuit descriptions, it will be stated that the ground has been shown as a circuit path; also, that grounded battery is the source of electric energy. This method has seemed the simplest for the disclosure, but it will be understood that the system contemplates that full metallic circuits and dynamo sources of any character of electric current may be employed in lieu of that specifically indicated.

It will be assumed that one (or more) of the multipled circuit closers 7, 8, 9 and 10 (also shown in Figs. 1, 6 and 6B), is operated due to a pedestrian standing upon the operating plate 6 thereof, or that the vehicle is in the waiting position shown in Fig. 26, wherein armature 16 is attracted. This will close a circuit from ground, armature 11 to the winding of relay 5, the relay 5 being actuated. It will be further assumed that at the time the ralay 5 actuates, the grounding device 1 is in the position shown in the drawings; or at least not in the position to connect ground to the conductor 2.

A circuit path is now prepared from the conductor 2, switch-arm 12, upper armature of relay 5, switch spring 13, make-before-break spring 14 to the winding of relay 15. The relay 5 will be held actuated only subject to a pedestrian remaining upon one of the operating plates 6, unless the armature 16, or armature 16'' shown in Fig. 27, or both latter said armatures are maintained operated, under which said assumed condition the relay 5 will be actuated, the object of which will appear presently.

When the grounding device 1 grounds conductor 2, this ground will be applied through the said prepared path to the winding of relay 15, the relay 15 actuating and locking through armature 17, conductor 18, switch-arm 19, brush 20, commutator C', ring D' to ground. Grounded armature 25 operatively energizes relay 26, applying ground from armature 27 to conductor 29, switch-arm 30, resistance 31, motor 32, switch-arm 33 to grounded battery. The motor 32 will start rotating, but slower than its designed normal speed, due to the obstruction involved in resistance 31. It will be manifest that if relay 5 is not actuated at the time the conductor 2 becomes grounded, the relay 15 will not be caused to actuate. In this connection, it will be noted that due to the operation of the make-before-break spring 14, the path from spring 14 to conductor 2 is opened by way of preventing the conductor 2 from being maintained ground over the conductor 18.

It will be assumed that a vehicle moves towards the east along the south side of the cross street, in the direction shown by the arrow in Figs. 1 and 26, and that the front wheel 34 thereof passes over the top plate 36 of the circuit closer 35 shown in Figs. 7 and 7B, the conductor 2 being ungrounded at the time. A circuit path will be closed from ground, contacts corresponding to 37—38 to the winding of relay 40. Armature 42 will operate to close a locking circuit for relay 40 from its winding, armature 43 to ground on armature 42. Armature 16 will close a circuit to energize relay 5, preparatory to energizing the relay 15 from conductor 2.

At the time relay 5 actuates, its lower armature energizes lamp 46, which is shown surmounting the lantern as a guard signal that the specific lantern control mechanism is set for the next potential halting period. The latter upon being observed glowing by a pedestrian or driver of a vehicle desiring to cross the traffic having the right of way makes it unnecessary for him to cause a setting. Again, it gives notice to the traffic having the right of way of the condition, which may operate to cause the latter traffic to voluntarily subordinate its rights for a short period to thereby forestall a longer signal halting, since the party desiring to cross the moving traffic may proceed when given a resonable opportunity, without applying a halting signal.

If the wheel 34 is now passed over the circuit closer 47 (like circuit closer 35), the relay 48 will be energized to open the locking circuit of relay 40 at armature 43, causing relay 5 to retract its armatures and extinguish the lamp 46; that is, the wheel setting has been negated or disabled. If the rear wheel 50 next passes over circuit closer 35, the relay 40 will be operated and locked as before, and if the wheel 50 is then caused to pass over circuit closer 47, the relay 40 will be unlocked to again disable the setting. However, if the wheel 50 is caused to stop before passing over the circuit closer 47, as in the position of wheel 50 as drawn, the setting will endure until the conductor 2 becomes grounded to cause relay 26 to actuate. It will be noted that if the wheel 50 remains in the position shown in the drawings until the second or any successive grounding of conductor 2, the reactuation of relay 26 will occur responsive to any grounding of conductor 2, as the ground cannot be removed from the winding of relay 5 until relay 48 is caused to actuate. This latter lends itself to maintaining the set condition in case the traffic officer opens switch 12 to permit the main street traffic to remain normal, or personally directs the cross traffic to remain halted.

It will be clear that the street intersection or crossing point corresponding to relay 4 will have its companion lantern (not shown) operated independently of the crossing point corresponding to relay 5, and moreover, if the relays 5 and 4 are both actuated at the time the conductor 2 becomes grounded the relay (not shown) corresponding to relay 26, companion to relay 4, will coincidently operate. This latter functioning insures that regardless of when settings are effected at a crossing point; whether set by a pedestrian or a vehicle, the respective motors corresponding to 32 will be caused to simultaneously start. It will appear presently, that the restoration to normal condition of the said lamps of the respective lanterns may occur in any predetermined variable time, so that while all detainments of traffic along the main street will initially occur simultaneously, due to varying the density of cross traffic at the crossing point, the respective crossing detainments may be variable with respect to each other. That is, it will not be necessary to hold main-street traffic as long at crossings where the cross traffic is light, as where it is heavy.

Making the potential halting periods for all crossings along a main street coincident precludes traffic being constantly disturbed and irregularly broken up, as it were.

In view of the foregoing descriptions, the operation of Fig. 26, into which Fig. 27 is introduced, will be understood, having in mind that the designations of elements in Fig. 27 corresponding to those in Fig. 26 are seconded. The object of employing independent relays 40—40'' and 48—48'' is to insure that opposite direction cross traffic will not confuse settings, as otherwise a setting made by the wheel 50 might be disabled by the wheel 50'' were the circuit closers 35—35'' and 47—47'' tied in multiple to relays 40 and 48, respectively. If either relay 40 or 40'' is actuated when the conductor 2 becomes grounded, the relay 15 will actuate and lock for the object set forth.

With reference to Figs. 8 to 27, the motor 32 drives the pinion shaft 51 through the agency of the worm 53 and the worm-wheel 54. The pinion 55, which is rigidly secured to the shaft 51, drives the gear-wheel 56. The gear-wheel 56, which also serves as a ratchet-wheel, revolves idly on the shaft 57. The front face indicating disc 60 is rigidly secured to the shaft 57. A pawl 61 is secured to the disc 60 by a spindle 62 which passes revolvably through the disc 60. The handle 63 and the pawl 61 are rigidly attached to the spindle 62. The resilience of a coil-spring 65, the opposite ends of which are rigidly secured between the pawl 61 and the disc 60 serves to keep the pawl normally seated in engagement with the teeth of the gear-wheel 56. The handle 63 may be turned clockwise against the resilience of the spring 65 to disengage the pawl from the teeth of the gear-wheel 56. The disc 60 and its attached shaft 57 can then be freely revolved in either direction. The handle 67, which is rigidly attached to the disc 60 is for the purpose of aiding in securing a hold upon the disc.

As indicated in Figs. 8, 9 and 10, the pinion 55 is narrower than the driven gear 56 and meshes along one edge thereof so that the pawl 61 may pass alongside of the pinion 55 as the pawl is rotated by the advance of the gear as 56.

It will be manifest that if it is desired to turn the disc clockwise, it will not be necessary to manually turn the handle 63 to disengage the pawl 61, as the pawl will then move over the teeth of the gear-wheel 56 by ratchet action. It will also be manifest that if the shaft 51 is driven in a counter-clockwise direction as viewed from the left-hand end of the shaft 51, the gear-wheel 56 will be driven clockwise as indicated by the solid arrow in Fig. 8, and through the agency of the pawl 61, will carry the disc 60 and attached shaft revolvably with it. The shaft 57 is journaled between bearings in the standards or support members 71 and 72 shown in elevation in Figs. 14 and 11, respectively. A shaft 57 carries the set of commutators and ring shown in Fig. 18. It also carries two other similar sets of modified commutator segments and rings. And it carries a single commutator 75 and ring 76. The shaft further carries a switch-operating cam 77 (shown in Fig. 15) for closing an alternative circuit path of the motor energizing path at off-normal positions of the shaft 57. A collar 69 is secured to the shaft 57 between the commutator A' and the sleeve 70 on standard 71. The sleeve projection 70 serves as an extended bearing for the shaft, as well as a spindle for the switch-arm 88 shown in Figs. 12 and 13.

The commutators A', B' and C' in Figs. 19, 20 and 21, respectively, indicated in Fig. 26, show the live and dead segments; the solid black portions denoting insulation or recessed portions which do not engage, the brush engaging the light portions. The commutators are insulated from the shaft 57, but each set of three live segments or bands are conductively related to a companion ring, such as D' in Fig. 18. Commutator and ring sets 81 to 84 and 85 to 88, respectively, are similar to the set shown in Fig. 18, but have modified segments as indicated in Fig. 26. The live segment of commutator 75 is conductively related to ring 76 and the segment form is indicated in Fig. 26.

The switch-arm 88 carries two independently insulated brushes or wipers 19 and 89, which are respectively cooperative with pairs of contact studs mounted on the segment sheet of insulating material 90. That is, brush 19 is shown joining studs 91 and 92 and brush 89 is shown joining studs 93 and 94. The switch-arm 88 carries a double pointed index 96 clamped to the spindle 97 by the handle-nut 98; the spindle 97 being rigidly attached to the switch-arm 88. Thus, a traffic officer can, by taking hold of the handle, gyrate the switch-arm 88 counter-clockwise so that the index 96 will assume the dotted position 96', at which time the brushes 19 and 89 will assume the vertical dotted positions, joining studs 101—102 and 103—104, respectively. In the same manner, the index 96 may be moved to the dotted position 96'', at which time the brushes 19 and 89 will assume the left-hand dotted positions, joining studs 105—106 and 107—108, respectively. The object of the switch-arm 88 and its brushes 19 and 89 will appear presently.

The brush support rod 109 carries a movable insulated brush-holder for each commutator and each ring. The brush 110 and its clamp-holder 112 is shown in detail in Fig. 19. The brush 20 and its clamp holder 114 is shown in detail in Fig. 21 and the brush 22 and its clamp-holder 116 is shown in detail in Fig. 22, though it will be understood that the form of the said brushes and clamp holders therefor may be of any suitable mechanical design. This also applies to the commutators and rings, as well as the other mechanical details which have been, or which will be detailed.

The switch springs 120—121 are retained in a clamp holder (shown in Fig. 15) 122, for movably securing it to the rod 109, and cooperates with the cam 77 so that when the shaft 57 revolves from normal position the springs 120—121 will engage, and after the cam has revolved to normal position the said springs will be disengaged by a quick break due to the notch 125.

The corresponding brushes of the generally similar commutators and rings are alike, respectively. And the bored portion of the holders detailed in Figs. 15, 19, 21 and 22 fit for clamping to the rod 109 through the agency of the thumb screws 131, 132, 133 and 134, respectively. The brushes have an elongated screw-hole to admit of longitudinal adjustment, as shown in Fig. 23.

Going back to the condition ensuing at the time the motor 32 started, it will be noted that the shaft 57 then became under drive through the agency of the pawl 61, so that the springs 120—121 are forthwith engaged to maintain the conductor 29 grounded independent of the attracted condition of the grounded armature 27. This is to insure that the shaft 57 will be restored to normal by the motor 32, in the event relay 15 is unlocked while the shaft 57 is off-normal, which latter condition will normally ensue, as will appear.

At the time the circuit to the motor 32 was closed by grounded armature 27, this ground on conductor 29 was applied through brush 89, studs 93—94, brush 141, ring 84 to the free terminal of orange colored lamp 143, the latter said lamp glowing to indicate that the normally glowing lamp 144 will presently extinguish and the lamp 145 will coincidently glow. In this connection, it will be noted that the lamp 144 is normally energized from the armature 27 and also from grounded brush 146, commutator 75, brush 76 to conductor 147. When armature 27 attracts, the ground to conductor 147 is maintained from brush 146 until the commutator 75 has rotated (approximately) five degrees counter-clockwise, at which time the insulated portion of the commutator 83 will have passed under the brush 141 for extinguishing the orange lamp 143. The live portion of commutator 87 having passed under brush 148, a ground path is completed from conductor 29, stud 94, ring 88 to the free terminal of lamp 145, causing it to glow.

With reference to Figs. 2, 3, 4 and 5, it will be noted that the north and south faces of the lanterns are illuminated green and the east and west faces of the lantern are illuminated red normally. This is because the lamp 144 is behind the set of four topmost discs indicated as normally radiating light in the Figs. 2, 3, 4 and 5. The lamp 143 is behind the set of middle discs designated as orange in Figs. 2, 3, 4 and 5, and the lamp 145 is behind the set of four lowermost discs shown in Figs. 2, 3, 4 and 5. The lamp 46 surmounting the lantern is glowing to indicate a set condition due to the locked condition of relay 40.

It will therefore be manifest that forthwith upon the attraction of armature 27, responsive to the grounding of conductor 2, the orange lamp 143 will illuminate indicative to the traffic in all directions that the lamp 144 will presently extinguish and the lowermost lamp 145 will coincidentally alternatively glow. That is, that the cross traffic will be given preferred traffic rights to the main traffic when the lamp 144 extinguishes and the lamp 145 glows. In this connection, it will be noted that when relay 15 actuates and locks, the circuit to relay 5 is opened at armature 11, causing guard lamp 46 to extinguish.

It is assumed that the speed of the motor 32, in view of the included resistance 31, is such that it will revolve the shaft 57 in 50 seconds. Due to the length of the live segments on the commutator 87, the lamp 145 will glow 25 seconds; being until the insulated portion passes under the brush 148. Due to the live segment of the commutator 83, the lamp 143 will extinguish coincidently with the extinguishment of the lamp 144 and the glowing of lamp 145, though it will be manifest that by varying the length of the live segment of the commutator 83, the lamp 143 may be retained glowing after lamp 144 extinguishes and lamp 145 glows, for example. Further, by varying the length of the live segment of the commutator 75, the lamp 144 may be retained glowing after lamp 145 starts glowing, for example. Due to the spacing of the lower live segment of the commutator 83, the lamp 143 will be energized in advance of the extinguishment of lamp 145 consequent to the insulated portion of commutator 87 passing under the brush 148. It will be noted that the brush 20 will receive ground to retain relay 15 locked and relay 26 actuated until lamp 145 is extinguished. Therefore, at the time lamp 145 extinguishes, the lamp 144 will glow and the lamp 143 will extinguish due to the lower live segment of commutator 83 passing from under the brush 141. The normal condition of the lantern will now exist. However, the brush 146 is not resting upon the live segment of the commutator 75. Due to the contacts 120—121 being engaged, the motor 32 will be maintained energized until the shaft returns to normal position. Further, due to the conductor 2 not being subject to being grounded oftener than one time per minute, the shaft 57 will have approximately 25 seconds to restore to normal, during which time the conductor 29 will not be grounded responsive to conductor 2, but may be otherwise grounded under the directive control of the traffic officer, as will appear presently, but to no operative purpose until the shaft 57 restores to normal under drive of the motor 32, or restored manually.

The traffic officer may, at will, initiate the operation of the motor 32 without operating one of the circuit closers before referred to. One method is to operate the switch 151 to apply ground to relay 15, and at the same time disconnect the extension from the switch 151 towards the armature of relay 5 to preclude falsely grounding the conductor 2, in the event relay 5 may be actuated at the time, which would operate to prematurely ground the conductor 2 with relation to other crossing apparatus, as relay 4, connected therefrom. The relay 15 will lock over the before traced path and the lamps will be controlled as has been described. If the switch 151 is restored to normal forthwith after operating it; at least before the conductor 2 becomes grounded in the normal operation of the grounding device 1, the tap to conductor 2 will be disabled at spring 14, due to the attracted condition of armature 17. Another way of initiating the operation of the motor 32 is for the traffic officer to manually turn the disc 60 clockwise by means of handle 67 or handle 63. This will close the springs 120—121, but due to the fact the cam 77 will have turned more than five degrees before effectively operating springs 120—121, because of adjustment, the brush 141 will not complete a ground path from spring 121 to the lamp 143, so that no preliminary orange light (or glowing of lamp 46) will warn of the impending change in traffic rights. That is, the lamp 144 will extinguish and the lamp 145 will glow without the lamp 143 glowing. It will, however, be manifest that by suitably shaping the cam 77 so as to precipitately close the springs 120—121 upon an off-normal movement of the shaft 57, the warning glowing of the lamp 143 may be effected by the traffic officer slowly turning the shaft 57 at the starting.

In case it is desired to have the particular crossing signal lamps operate automatically continuously, the switch arm 155 will be moved to its dotted position to permanently ground the conductor 29. This will disable the springs 120—121 from stopping the motor 32, so that the operation will be continuous.

In the present setting of the switch-arms 88 and 30, the main street traffic will be given secondary rights for 25 seconds (counting from the glowing of the lamp 143) and superior rights 25 seconds in continuous cycles, regardless of ground applied to conductor 2. If the motor is made to run faster, by removing resistance through moving the switch-arm 30 to the upper dotted position, the intervals will be made shorter, for in lieu of the motor causing the shaft 57 to revolve at the rate of one revolution in fifty seconds, it will effect a revolution in a shorter time. Conversely, if the arm 30 is moved to the lower dotted position, for example, the motor will be made to revolve slower, in turn, causing the shaft 57 to take a longer time to completely revolve and therefore cause the lamp 145 to glow longer. At heavy traffic hours, it will be convenient to maintain the switch-arm 155 closed and the switch-arm 30 on the contact stud affording the desired periods of lamp operation.

In order to insure that the lamp 143 will always glow the same length of time, regardless of the position of switch-arm 30, the relay 156 is introduced in multiple relation with lamp 143. This will cause ground from conductor 29 to be applied through the armature of relay 156 to the right-hand terminal of motor 32, excluding any resistance obstruction introduced through the agency of switch-arm 30. The motor 32 will thus have its normal rated speed during the time lamp 143 is glowing, regardless of its speed at other periods which affect the duration of the glowings of lamps 144 and 145. However, a means shown in Fig. 33, applicable to Fig. 26 will be described presently, the object of which is to definitely vary the duration of glowing the orange lamp, regardless of the glowings of lamps 144 to 145. The object of this is to employ the orange lamp for special traffic control, which latter may require duration change for the orange lamp, depending upon general traffic conditions, which are variable.

It will be noted that if the operating mechanism is set to be directively controlled by a pedestrian or driver of a vehicle, as set forth, and the traffic officer desires to shorten the prearranged holding period during the time the cross traffic has superior rights, due perhaps to the cross traffic clearing, and therefore rendering it unnecessary for holding the main street traffic, it may be done by manually advancing the disc 60 clockwise so that the arrow 158 (which is shown in its normal position) registers with the left-hand point of the index 96. When at the latter position the commutator 83 is in the position to cause the lamp 143 to glow as a preliminary signal that lamp 144 will presently glow and lamp 145 will extinguish. In this instance, pawl 61 of the ratchet is advanced idly over the teeth of the gear-wheel 56, setting behind each gear tooth passed over. The further movement of the gear-wheel 56 operating against the pawl 61 causes the shaft 57 to be normally driven by the motor to its normal position of rest, as shown in the drawings.

In a relatively like manner, the traffic officer can, by turning the handle 63 clockwise, unseat the pawl 61 and then render the disc 60 subject to be manually turned counter-clockwise as far as desired, or possibly held stationary in order to prolong the glowing of lamp 145 at will. The pawl 61 may then be freed to allow the gear-wheel 56 to automatically restore the shaft to normal position, or the traffic officer may manually advance the arrow 158 to the left-hand point of the index 96. In this connection, it will be noted that if the traffic officer desires to precipitately extinguish the lamp 145, in lieu of advancing the pointer 158 to the left-hand point of the index 96, he will advance it to the right-hand point of the said index, or at any intermediate point between the points of the index depending upon if a short preliminary glowing of lamp 143 is desired or none is desired, it being remembered that while the arrow 158 is moving clockwise between the points of the index 96 the lamp 143 is glowing.

The switch 33 is used to stop the motor 32 at any desired time, leaving the lamps which may be glowing so maintained. This switch 33 may therefore be used to delay the extinguishment of lamp 145 as long as desired, by moving it to its dotted position. The switch-arm 12 (or 159) may be opened, if it is desired to disable a crossing equipment from being controlled from conductor 2.

The general operation of the system being clear, the method of changing the setting of the operating mechanism at any specific crossing will be discussed. By gyrating the switch-arm 88 counter-clockwise to the position 96' shown dotted, of the index 96, the brushes 19 and 89 will join contact studs 101—102 and 103—104, respectively. This will substitute commutators B', 82 and 86 for commutators C', 83 and 87, respectively. The operative effect of the change is to maintain the lamp 145 glowing a shorter time before causing the lamp 144 to alternatively glow, anticipated by the glowing of lamp 143 the same or altered period as before described. By gyrating the switch-arm 88 counter-clockwise to the dotted position 96'' of the index 96, the brushes 19 and 89 will join contact studs 105—106 and 107—108, respectively, thus substituting the commutators A', 81 and 85 for the commutators B', 82 and 86, respectively. The operative effect will be relatively the same as the last before change of the switch-arm 88 with the effect of still further shortening the period the lamp 145 is maintained glowing before causing the lamp 144 to alternatively glow, anticipated by the glowing of the lamp 143, the same as before described. The function of the switch-arm 88 can be extended by supplementing the described altering of the speed of the motor 32 through the agency of the switch-arm 30. The significance of the two points of the index 96 is the same regardless of which one of the three alternative positions is occupied.

With reference to Fig. 27, the relays 40'' and 48'' are normally unenergized, while of the front wheel 34'' is advanced over circuit-closer 35'' to the dotted position of wheel 34'', the armatures 42'' and 16'' will assume their dotted positions, and relay 5 will actuate, since armature 16'' will ground conductor m. If wheel 34'' advances over circuit-closer 47'', relay 40'' will become unlocked; relay 40'' again actuating and locking if wheel 50 advances over circuit-closer 35'', and will then unlock if wheel 50'' advances over circuit-closer 47''.

The circuit-closer Figs. 6 and 6B may be any suitable form, in view of desirable design, though the insulated springs 161—162 are preferably protected against moisture. The spring 161 normally maintains the contacts apart, and the hinged top-plate 6 unseated. The springs 161—162 will engage responsive to the weight of a pedestrian on the top-plate 6. The devices 7, 8, 9 and 10 shown in Figs. 1 and 26 each represent the device shown in Figs. 6 and 6B.

The circuit closer Figs. 7 and 7B is generally like Figs. 6 and 6B, respectively, with the exception that its top-plate is preferably flush with the street surface. The device Figs. 7 and 7B is shown at each 35 and 47 in Figs. 26 and 1, and 35'' and 47'' in Fig. 27.

Referring to Fig. 7C, the top-plate 701 corresponds to top-plate 6 and 36 in Figs. 6 and 7, respectively. The part 702 is a bell-crank, integral with the top-plate 701; forked at its lower end. The enclosure 703 contains the insulated switch-springs 704 and 705, corresponding to springs 161 and 162, in Fig. 6B, and springs 38 and 37 in Fig. 7B, respectively. The piston 706 is linked to the bell-crank 702 by the forked end striding the piston 706, retained by stop-pins 709 and 714. The piston 706 operates through a water tight gland 710. The metallic element 712 is insulatedly attached to the piston 706. The depression of top-plate 701 against the resilience of spring 708 causes a circuit to be closed through the contact springs 703 and 704 for the object described for the said corresponding springs.

While three sets of alternative commutators are shown, controlled by the brushes 19 and 89, attached to switch-arm 88, it will be understood that one set of commutators only may be employed; for example, the set drawn operatively employed in Fig. 26 and shown in Figs. 9 and 10. Under such condition, the switch-arm 88, brushes 19 and 89 and the cooperating studs would be dispensed with, and the operative circuits shown in the drawing Fig. 26 made permanent so far as the circuit paths subject to change by brushes 19 and 89 are concerned. The index 96, under the latter condition, would be rigidly fixed in the position drawn. The duration of the glowing of lamp 145 will be varied at will by the switch-arm 30. Of course, any other method of altering the speed of the motor 32 may be employed, in lieu of the resistances controlled by the switch-arm 30.

An object of the lamp 46 is to warn the traffic in advance, so that if the maintained traffic is not too dense, it may voluntarily retard itself to permit cross traffic, which may be relatively light. This retarding may forestall a prolonged enforced subordination of the main street traffic. The lamp 46 may be placed where conveniently visible to the traffic, as if the said lamp 46 is glowing there will be no necessity for a second pedestrian, for instance, stepping upon a plate 6. This is aside from the psychological phase of warning the main street traffic in advance of a potential change period, that if it deos not voluntarily slow-up to permit safe crossing of the main street, it will be peremptorily subordinated for a definite period. The latter would particularly apply at points where there is no traffic officer in attendance.

A preferred embodiment of the system is shown in Figs. 28 to 33. The general operation of the embodiment shown in Figs. 28 to 33 is like that shown in Figs. 1 to 26; corresponding parts being similarly numbered, but with a prime added. That is, the description with reference to Figs. 1 to 27 is to be applied to Figs. 28 to 33 in view of corresponding reference numerals, having in mind the prime. Generally stated, the preferred embodiment dispenses with the alternative commutators and switch-arm 88 for changing the circuits to operate with respect to one or the other of the sets of commutators. A single set of commutators rigidly secured on the shaft 57' and insulated therefrom, is employed, having live and dead segments, respectively, as indicated in Fig. 33. The period of glowing of the orange lamp 143' can be varied at will by the setting of a switch-arm, as will appear presently.

The commutator 201 has its live segment electrically tied to ring 202. The commutator 203 has its live segment electrically tied to ring 204. The commutator 205 has its live segment tied to ring 206. The index 208 is rigidly attached to the stud 209. The latter said stud is rigidly attached to the standard or support member 210 through the hole 212 by a nut 214. The hole 216 in the projection 217 serves to carry one end of the brush support-rod 109'. It will be noted that the commutators 203 and 205 are of sufficient width to admit of two brushes; such as are shown in detail in Figs. 19 and 20, being placed side by side, but insulated from each other at their supports. The commutators 203 and 205 are thus double, though indicated as two single ones in the Fig. 33 for simplicity of disclosure. That is, the brushes 221 and 222 engage the same live segments of commutator 204 coincidently and brushes 223 and 224 engage the same live segments of commutator 206 coincidently. Brush 206 is applied to ground, and brush 204 is applied to the free terminal of orange lamp 143'.

In the preferred embodiment of the invention, the duration of the glowing of lamp 145' is determined by the speed of the motor; regulated by the switch-arm 30'. The circuit scheme of Fig. 33 is like that shown as operative in Fig. 26, with the addition of the commutator brush 221. That is, brushes 225, 222, 223 and 224 and cooperating commutators effectively correspond to the brushes 20, 141, 148 and 146, and the cooperating commutators, respectively. The operation of the system set forth in Figs. 28 and 33 will therefore be understood without re-detailing operations corresponding to those described, with respect to Figs. 1 to 27.

When relay 26' actuates, the motor 32' will be caused to start rotating, responsive to current applied through switch-arm 30', and lamp 144' will be maintained energized from ground, ring 206, brush 224 to the free terminal of lamp 144' after armature 27' attracts from the resting contact to ground conductor 29'. Ground from conductor 29' is applied through brush 222, ring 204 to the free terminal of lamp 143'. Ground from ring 204 will be applied through brush 221 to the winding of relay 230, the latter said relay actuating. Ground from conductor 29' will then be applied through switch-arm 231, armature of relay 230 to the motor 32'. This will short-circuit the resistance included by the switch-arm 30', so the motor speed will become normal. The ground on conductor 29' will also be applied to free pole of orange lamp 143' to cause it to glow. The lamp 143' will glow, and the said resistance included by the switch-arm 30' will remain short-circuited until the insulated segment of commutator 203 passes under brush 222, at which time ground will be removed from brush 221. Relay 230 will deactuate to cause the motor 32' to be energized through switch-arm 30', and ground from conductor 29' will be removed from the free terminal of the orange lamp 143' to extinguish it.

Lamp 145' is energized from conductor 29' by way of brush 225, commutator 201, ring 202 at the time lamp 144' extinguishes due to armature 27' having attracted against its make contact. Relay 15' locks through brush 223, ring 206 to ground until lamp 145' extinguishes due to the insulation of commutators 201 and 205 passing under brushes 225 and 223, respectively; timed to occur coincidently. When relay 15' unlocks, armature 27' will retract to energize lamp 144', it being noted that before relay 15' unlocks and lamp 145' extinguishes, ground from conductor 29', brush 222, commutator 203, ring 204 will be applied through live segment of commutator 203, brush 221 to the winding of relay 230. This ground will also energize orange lamp 143'. The locking circuit for relay 15' is timed to open coincidently with orange lamp 143' extinguishing and the relay 230 becoming deenergized. The motor 32' is caused to operate at its normal speed during the time the orange lamp 143' is glowing, due to being energized through switch-arm 231, regardless of the speed at other times in accordance with the setting of the switch-arm 30'. This insures a constant period of glowing of the orange lamp 143' under the automatic control, regardless of the varying changes possible of applying to lamp 144' by changing the speed of the motor through the agency of switch-arm 30'. It thus permits the traffic officer to adjust the speed of the motor 32' to suit the desired period of glowing of lamps 144' and 145' without changing the period of glowing of lamp 143'. It is manifest that the length of the segments of the commutators may be varied to suit the specific requirements, in view of the length of periods and frequency thereof. The introduction of brush 221 accomplishes the same results as relay 156 in Fig. 26; otherwise Fig. 33 operates like Fig. 26 as drawn and with switch-arms 19 and 89 as shown in the drawings.

An important feature of the invention is the switch-arm 231 and the resistance adapted to be reduced thereby. By revolving the switch-arm 231 clockwise, resting it on and one of the contact studs 232, for instance, the motor 32' will be reduced in speed during the time relay 230 is actuated in accordance with the resistance added by the switch-arm 231. That is, in place of the motor 32' running at normal speed during the time the orange lamp 143' is glowing and the switch-arm 231 is in the position drawn, it will run at reduced speed and therefore prolong the said glowing. This enables the traffic officer to alter the duration of the glowing of the orange lamp 143' from time to time as traffic conditions warrant, having in mind that the orange lamp may be employed as a pedestrian signal wherein the pedestrians have right of way in all directions at the crossing and wherein all vehicular traffic is halted thereat during the period the orange lamp 143' is glowing. It will be noted that the speed of the motor at all times excepting when the orange lamp 143' is not glowing will be governed by the switch-arm 30', and as will appear presently, by the lower armature of relay 26' when desired. When the relay 26' operates from normal, relay 230 will operate responsive thereto, wherein the speed of the motor will be governed only by the position of the switch-arm 231 during the time orange lamp 143' is glowing, after which, due to the deactuation of relay 230 coincident with the extinguishment of the orange lamp 143', the speed of the motor will be governed by the position of switch-arm 30' or the retracted state of the lower armature of relay 26' as will appear.

Under conditions of operation wherein the glowing of the lamp 145' will be approximately half or more than half the time space between the ground applications to conductor 2', it is preferred to close the circuit including the lower armature of relay 26' in order that any resistance included by the arm 30' will be short-circuited upon the deactuation of relay 26'. This will insure the restoration of the shaft 57' before the next grounding of conductor 2'. However, the duration of a glowing of lamp 145' will usually be less than half the grounding intervals of conductor 2', since lamp 145' only glows to give cross traffic right of way over the main street.

The signals have been shown as lamps. It is manifest that mechanical signals may be substituted for all or part of the lamps without departing from the spirit of the invention.

Also, it is manifest that the system may be employed in part only, or amplified, without departing from the scope of the invention. For example, wherein there is no cross street to the main street and wherein foot traffic only may have occasion to cross the main street traffic, as may be met, for instance, along drives in parks.

The scope of the invention, having in mind the possible modifications and adaptations, will be defined by the appended claims.

I claim:—

1. In a traffic control signaling system comprising a signal on a highway having a "stop" and "go" indication, a motor, means operable by said motor for effecting alternate exhibition of said indications from "stop" to "go" and back to "stop", an operating conductor, means for transmitting periodic electrical impulses over said conductor, means for starting the operation of the motor upon the transmission of a said periodic impulse, a manually operable key, means operable by said key for starting the motor, a locking circuit for said motor for maintaining the motor operating after starting for a timed period less than the period of time between said periodic impulses.

2. In a traffic control signaling system comprising a succession of signals spaced along a highway, each signal having a "stop" and "go" indication, means including a motor for each signal for cyclically effecting alternate exhibition of said indications from "stop" to "go" and back to "stop", a start conductor extending to all of said signals, means for transmitting periodic electrical impulses over said conductor, means for each signal actuated by traffic and responsive to one of said impulses for starting said motors, a manual switch for each signal, means including a locking relay energized and locked responsive to operating a said switch for preparing only the corresponding motor to start responsive to an impulse applied over the start conductor to thereupon start and complete a single one of its cyclic operations and stop, and means operated by the motor when effecting the completion of a said cycle to unlock the relay to thereby prevent the motor from being again started unless said switch is in position to again energize the locking relay.

3. In a traffic control signaling system comprising a signal on a highway having a "stop" and "go" indication, means including a motor for the signal for effecting alternate exhibition of said indications from "stop" to "go" and back to "stop", an operating conductor, means for transmitting periodic electrical impulses over said conductor, means when connected to said conductor, for correspondingly starting the operation of the motor to change the "stop" indication to "go" indication and back to "stop" in cycles corresponding in length to the intervals of said impulses, a pair of street surface switches adapted to be successively operated by traffic approaching the highway, means operated by a first one of said switches to connect the operating conductor to the third named means to start the motor upon a said impulse being applied over the conductor, means operated by the second one of said switches to disconnect said operating conductor from said third named means, whereby a vehicle approaching the highway and passing over both switches will not set the signal for operation responsive to the next following impulse applied over the operating conductor, while if the vehicle passes over only one of said switches the signal will be set for operation responsive to the next following impulse applied over the operating conductor.

4. In a traffic control signaling system comprising a signal on a highway having a "stop" and "go" indication, means including a motor for the signal for effecting alternate exhibition of said indications from "stop" to "go" and back to "stop", an operating conductor, means for transmitting periodic electrical impulses over said conductor, means when connected to said conductor for correspondingly starting the operation of the motor to change the "stop" indication to "go" indication and back to "stop" in cycles corresponding in length to the intervals of said impulses, a pair of street surface switches adapted to be successively operated by traffic approaching the highway, a relay, means operated by said relay for connecting the operating conductor to the third named means, a holding circuit for said relay, means operated by a first one of said street switches for operating the relay and closing its holding circuit, and means operated by the second one of said switches operated for opening the holding circuit to unlock the relay first operated in order to disable said connection from the operating conductor, whereby a vehicle approaching the highway and passing over both switches will not set the signal for operation responsive to the next following impulse applied over the operating conductor, while if the vehicle passes over only one of said switches the signal will be set for operation responsive to the next following impulse applied over the operating conductor.

5. In a traffic control signaling system comprising a signal on a highway having a "stop" and "go" indication, means including a mover for the signal for effecting alternate exhibition of said indications from "stop" to "go" and back to "stop", means governed by the extent of approach of a vehicle towards the highway and which thereafter halts for thereupon setting up a condition for thereafter causing the mover to start for effecting said alternate exhibition and come to stop, and another means for unsetting said set condition responsive to the approaching vehicle proceeding further towards the highway.

6. In a highway traffic control signaling system, a signal having a "stop" and "go" indication, means including a mover for the signal for effecting alternate exhibition of said indications from "stop" to "go" and back to "stop", a conductor, a transmitting device for sending impulses periodically over said conductor, a first and a second setting device adapted to be successively operated by a vehicle wheel while propelled along the street approaching the highway, means responsive to operating said first setting device for preparing a circuit from said conductor for causing the mover to effectively operate responsive to a said impulse to change the "stop" indication to "go" and back to "stop" and thereupon stop, and means operated responsive to operating said second setting device before the impulse ensues to render the prepared circuit ineffective to operate the mover.

7. In a highway traffic control signaling system, a signal having a "stop" and "go" indication, means including a mover for the signal for effecting alternate exhibition of said indications from "stop" to "go" and back to "stop", a conductor, a transmitting device for sending impulses periodically over said conductor, a first and a second setting device adapted to be successively operated by a vehicle wheel while propelled along the street approaching the highway, means responsive to operating said first setting device for preparing a circuit from said conductor for causing the mover to effectively operate responsive to a said impulse to change the "stop" indication to "go" and back to "stop" and thereupon stop, means operated responsive to operating said second setting device before the impulse ensues to render the prepared circuit ineffective to operate the mover, and a warning signal operated by said first setting device for indicating to the traffic on the highway that the mover will presently operate to change the signal exhibition from "stop" to "go" unless said second setting device is thereafter operated before the next succeeding impulse ensues.

8. In a traffic control signaling system comprising a signal on a highway, having "stop", "go" and "change" indications, means including a motor and a controller driven by the motor for the signal for effecting alternate exhibition of said indication from "stop" to "change", "go", "change" and back to "stop" stages in cycles of predetermined periods, and means including a flexible drive connection between the motor and controller manually operated at will during the operation for changing the operated stage of the controller to an indicated degree while not affecting the stage of the motor, whereby the stage of the signal cycle can be changed at will during an operative cycle of the motor, without affecting the operation of the motor.

9. In a traffic control system, a traffic signal, a normally idle motor, means driven by said motor for operating said signal in pre-determined cycles for control of traffic, a control circuit for said motor, normally open switch means in said circuit whereby said circuit is deenergized, a second control circuit, a setting device for enabling said control circuit to be energized, when set, means for periodically applying a source of energy to the second control circuit when the setting device is set, means in said second control circuit for closing said switch means whereby the motor is started, and means effective responsive to the starting of the motor to drive the first named means for operating the signal to perform one predetermined cycle.

10. In a traffic control system, a traffic signal, a normally idle motor, means driven by said motor for operating said signal in predetermined cycles for control of traffic, a control circuit for said motor, normally open switch means in said circuit whereby said circuit is deenergized, a second control circuit, a setting device for enabling said control circuit to be energized, when set, means for periodically applying a source of energy to the second control circuit when the setting device is set, means in said second control circuit for closing said switch means whereby the motor is started, means effective responsive to the starting of the motor to drive the first named means for operating the signal to perform one predetermined cycle, and means whereby the setting device may be set and thereafter unset intermediate of two immediately successive periodic applications of energy to the second control circuit without causing the signal to operate.

11. In a traffic control system, a signal having "stop" and "go" indications, a motor, means operated by said motor for alternately exhibiting said indications from "stop" to "go" and back to "stop" in a timed cycle when said motor is operative on said means but maintains the "stop" indication when the motor is inoperative on said means, means for periodically causing said motor to operate the first said means for a time equal to said timed cycle and then be inoperative on the first said means for a predetermined time, and manually operable means for causing said motor to operate the first said means for one of said timed cycles prior to the expiration of said predetermined time.

12. In a highway traffic control signaling system comprising a signal on the highway having a "stop" and "go" indication and a "change" indication, means including an electric motor for the signal for effecting alternate exhibition of said indications from "stop" to "go" and back to "stop" wherein the "change" indication will be manifested antecedent to a change in the indication exhibited, including means for varying the duration of the "go" indication, and automatic means for including a resistance in circuit with the motor for causing the motor to operate at a fixed speed during the display of the change indication whereby the fixed duration of the change signal is always obtained.

13. In a highway traffic control signaling system comprising a signal on the highway having a "stop" and "go" indication and a "change" indication, means including an electric motor for the signal for effecting alternate exhibition of said indications from "stop" to "go" and back to "stop" wherein the "change" indication will be manifested antecedent to a change in the indication exhibited, including means for varying the duration of the "stop" indication, and means operated responsive to said motor for including a resistance in circuit with the motor for causing the motor to operate at a fixed speed during the display of the "change" indication whereby a fixed duration of the "change" signal is always obtained.

14. In a signal control system of the class described, the combination of a first set of traffic control signals normally arranged to simultaneously permit traffic to proceed on one street and restrain traffic on an intersecting street, a second set of traffic control signals reversely arranged, means for changing from one set of signals to the other to change the flow of traffic, a traffic change signal visible in opposite directions along each street, means for illuminating the traffic change signal in advance of each change of the traffic control signals, both said means involving a circuit controller capable of being progressively driven, a motor for driving said controller, means for varying the duration of one of said traffic control signals as desired, means for maintaining a constant duration of said change signal although varying the duration of the traffic control signal, means operated by a vehicle for causing said motor to effect a cycle of said operations of said three signals.

15. In a signal control system of the class described, the combination of a first set of traffic control signals normally arranged to simultaneously permit traffic to proceed on one street and restrain traffic on an intersecting street, a second set of traffic control signals reversely arranged, means for changing from one set of signals to the other to change the flow of traffic, a traffic change signal visible in opposite directions along each street, means for illuminating the traffic change signal in advance of each change of the traffic control signals, both said means involving a circuit controller capable of being progressively driven always in one direction, a motor for driving said controller, means for predetermining the speed of the motor so that the duration of one of said traffic control signals may be varied as desired, means for maintaining the constant duration of said change signal although varying the duration of the traffic control signal, means whereby said system may be rendered normally inert and the signal cycle only operated by a vehicle for causing said motor to affect a cycle of said operations of said three signals or to be operated automatically continuously.

16. An automatic signaling system for a plurality of highway intersections, each intersection including signal circuits arranged to provide a go signal for the main highway and a stop signal for the cross street, and circuits arranged to provide a stop signal for the main highway and a go signal for the cross street, switching means including a driving motor and rotatable member and contacts controlled thereby, said member being rotatably advanced always in one direction only by the driving motor to close and open the contacts through a complete cycle to alternately energize and deenergize the circuits through a cycle in which the go signal is taken from the main highway and given to the cross street for a predetermined period and then returned to the main highway for at least a predetermined fixed minimum period, said switching means normally inactive for maintaining the go signal on the main highway continuously, a circuit common to all said intersections, means for periodically varying said common circuit, means actuated by a vehicle on a cross street when said common circuit is varied to start the corresponding motor and operate said contacts to initiate the said cycle of the switching means, and means associated with the switching means to complete said cycle of operation of the contacts to complete said cycle of the switching means and to thereby restore the switching means to its normal condition at the end of a cycle whether responsive to an initial or a subsequent activation of the vehicle actuated means.

17. An automatic signaling system for a plurality of highway intersections, each intersection including signal circuits arranged to provide a go signal for the main highway and a stop signal for the cross street, and circuits arranged to provide a stop signal for the main highway and a go signal for the cross street, switching means including a driving motor and a rotatable member and contacts controlled thereby, said member being rotatably advanced always in one direction only by the driving motor to close and open the contacts through a complete cycle to alternately energize and de-energize the circuits through a cycle in which the go signal is taken from the main highway and given to the cross street for a predetermined period and then returned to the main highway for at least a predetermined fixed minimum period, said switching means normally inactive for maintaining the go signal on the main highway continuously, a circuit common to all said intersections, means for periodically varying said common circuit, means actuated by a vehicle on a cross street when said common circuit is varied to start the corresponding motor and operate said contacts to initiate the said cycle of the switching means, and means associated with the switching means to complete said cycle of operation of the contacts to complete said cycle of the switching means and thereby restore the switching means to its normal condition at the end of a cycle whether responsive to an initial or subsequent actuation of the vehicle actuated means, together with means for displaying a caution signal between both changes of go and stop signals, each caution signal appearing before the subsequent signal can be shown, and means for varying the period of display of the stop and go signals and maintaining the period of display of the caution signal.

HERBERT M. FRIENDLY.